Sept. 19, 1972    E. COHN ET AL    3,692,465
THREE ROLL PROCESSING APPARATUS, AND METHOD
FOR UTILIZATION THEREOF
Filed May 11, 1971    4 Sheets-Sheet 1

INVENTORS
EUGENE COHN
ROBERT FREZZA
BY Mandeville &
Schweitzer
ATTORNEYS

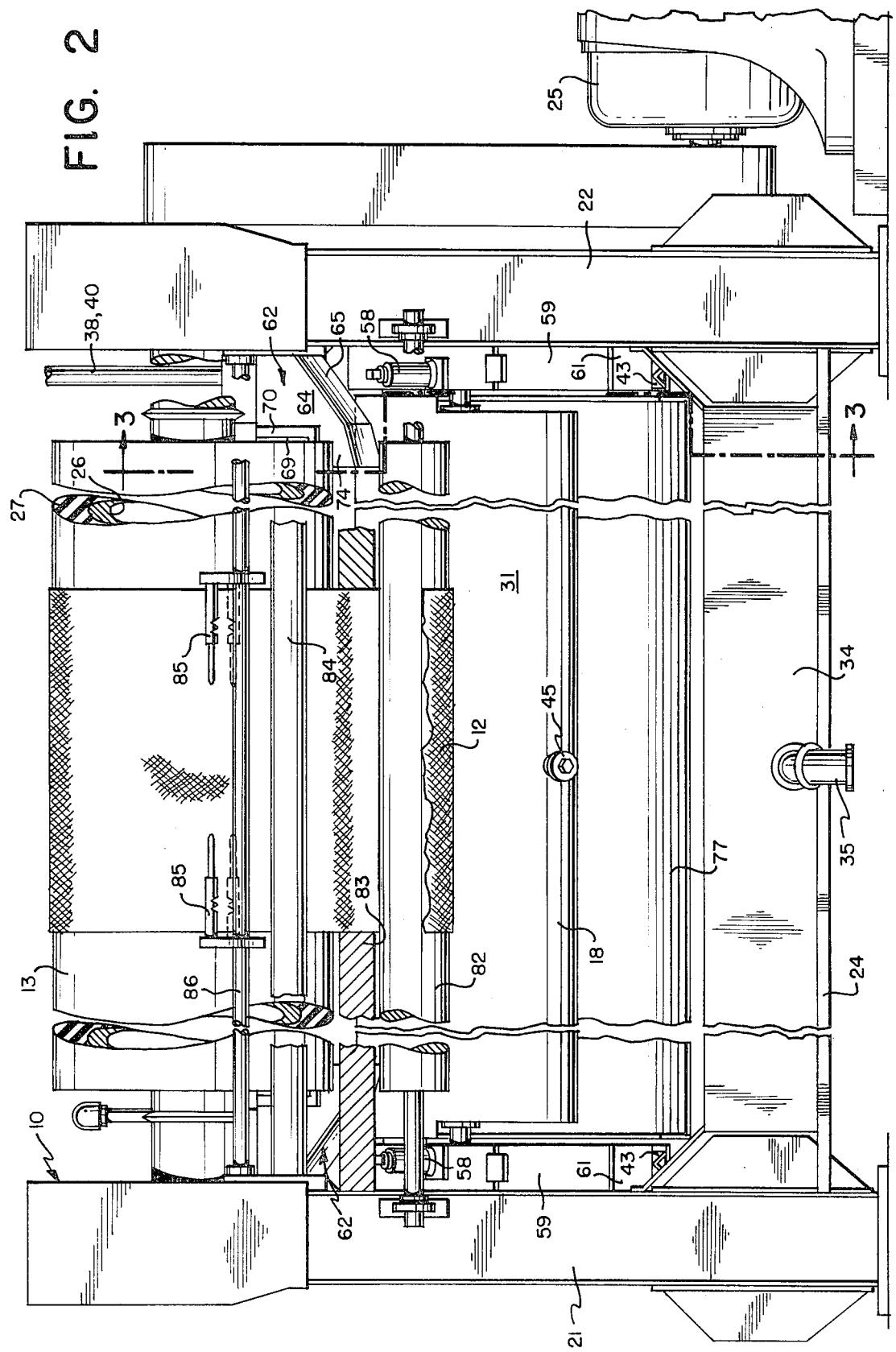

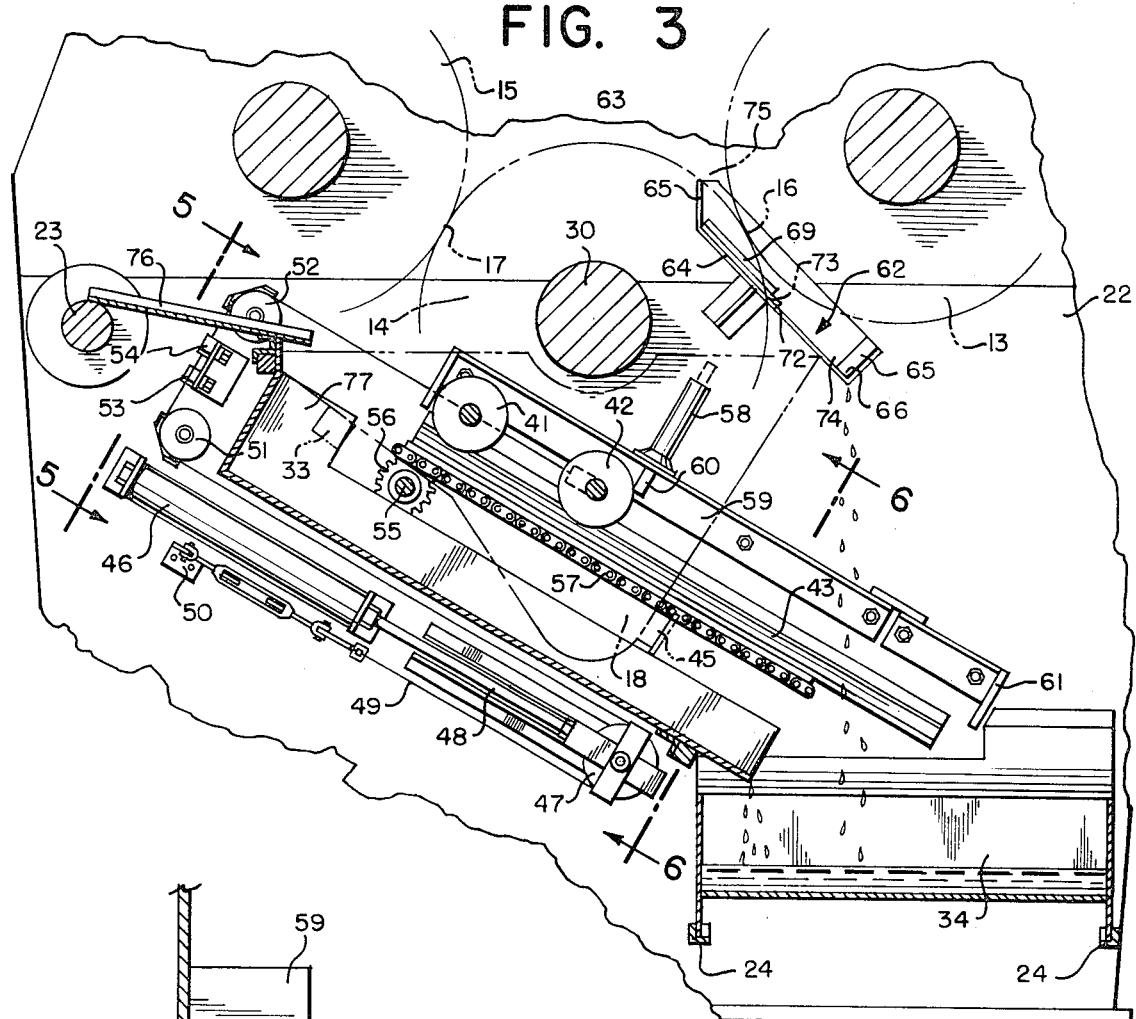
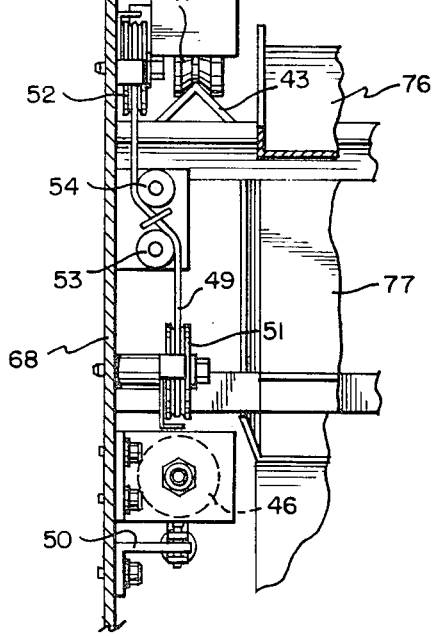

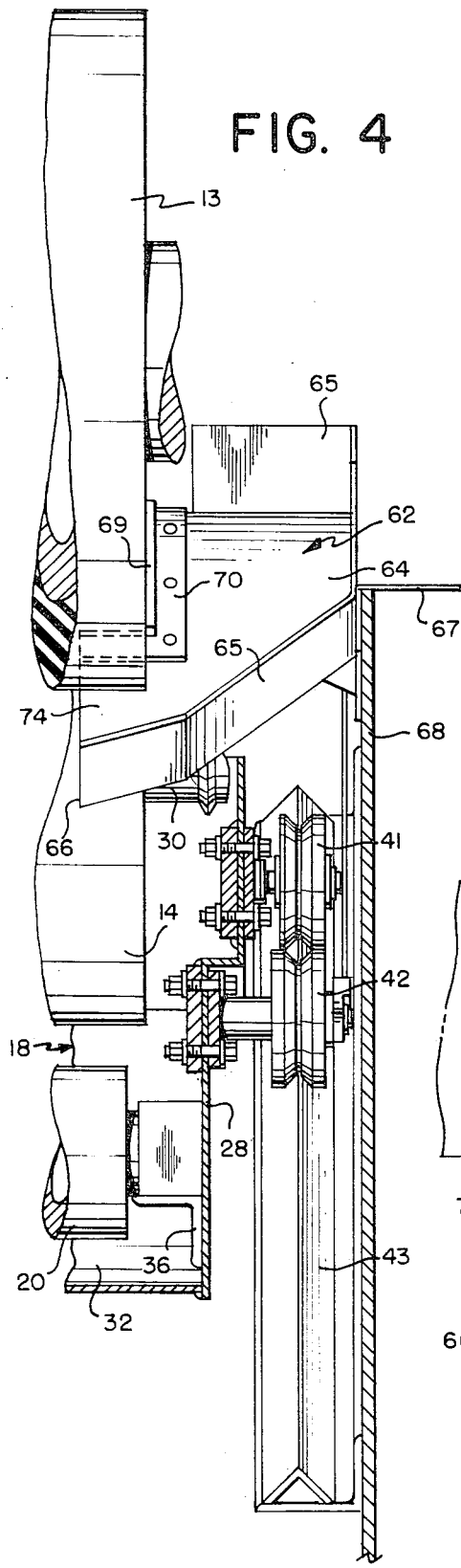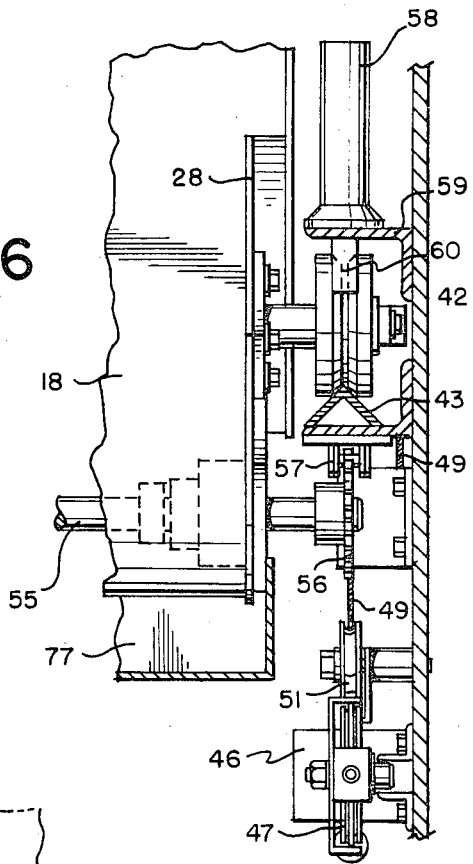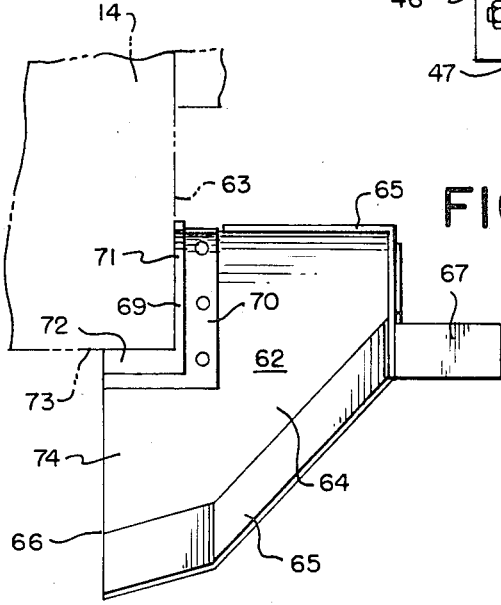

3,692,465
THREE ROLL PROCESSING APPARATUS, AND METHOD FOR UTILIZATION THEREOF
Eugene Cohn, Great Neck, and Robert Frezza, Carle Place, N.Y., assignors to Samcoe Holding Corporation, Woodside, N.Y.
Filed May 11, 1971, Ser. No. 142,128
Int. Cl. D06f 45/10, 45/12, 45/26
U.S. Cl. 8—151                                    17 Claims

ABSTRACT OF THE DISCLOSURE

The disclosure is directed to an apparatus for the processing of web materials, particularly, but not exclusively, fabrics in the open width. The apparatus preferably comprises three processing rollers arranged with their axes in parallel relation and arranged in an inverted triangular configuration. The central, lower roller is in contact at spaced points with the upper processing rollers at the entry side and exit side of the system. A first processing nip is formed at the entry side and typically may be utilized for extracting. A second processing nip is formed at the exit side and typically is used for padding. All of the processing rollers are resiliently covered.

The fabric is directed downwardly through the first or extracting nip, around the bottom of the central roller and upwardly through the second or padding nip. A pan of treating solution is disposed under the central, lower roller, and the lower extremities of this roller are immersed in the treating solution so that the fabric is impregnated with solution as it travels around the roller. Liquid squeezed from the fabric at the extracting nip flows laterally and is collected in drainage chutes disposed at the ends of the processing rollers. The drainage chutes direct the extracted liquid away from the treating solution disposed in the pan directly below. The apparatus of the invention provides a particularly simplified and reliable system for effecting an extracting-padding processing sequence in a three roller apparatus.

The new apparatus is also useful to great advantage in so-called "double dip" processing, in which reactive solutions are applied in sequence to the fabric.

RELATED PATENTS

The subject matter of the application is related in a general way to the subject matter of the S. Cohn et al., U.S. Pat. No. 3,207,616, particularly with respect to the utilization of three processing rollers in an inverted, triangular configuration to provide extracting and padding nips for the liquid processing of fabrics and the like. However, the structure of the present invention departs in significant ways from the structure of the patent, and represents an improvement thereover, at least for the processing of certain types of fabrics.

BACKGROUND AND PRIOR ART

In the processing of fabrics, it is frequently desired to impregnate the fabric with a liquid treating solution, such as a stabilizing resin, for example. At this stage of the processing, the fabric may already be wet from previous operations and therefore, the processing sequence typically involves a so-called extracting operation, in which liquid from prior operations is squeezed out of the fabric. The thus extracted fabric is conveyed through a bath of the desired treating solution for impregnation by the solution, and thereafter it is subjected to a padding operation, in which the solution is worked into the fabric and excess amounts of solution are squeezed out. The emerging fabric retains a predetermined amount of the treating solution, uniformly distributed through the fabric structure.

A particularly advantageous form of apparatus for accomplishing the extracting-impregnating-padding sequence of processing operations is reflected in the S. Cohn et al., U.S. Pat. No. 3,207,616. In accordance with that patent, three processing rollers are arranged in an inverted triangular configuration and in contacting relation whereby two processing nips are formed by the three rollers. The configuration of the three rollers is such as to form a trough above the central roller. By the application of sealing plates or dams, to the end surfaces of the processing rollers, the thus-formed trough may be utilized for the retention of a body of the desired processing liquid. The incoming fabric travels in a generally upward direction through the first or extracting nip, is conveyed by the central roller through the bath of treating solution, and then passes in a generally downward direction through the padding nip.

The process and apparatus of the above-mentioned Cohn et al. patent has proved to be highly advantageous and commercially successful. Nevertheless, the existing equipment presents certain practical day-to-day difficulties in the maintenance of perfect liquid sealing conditions at the interface of the end dams and the processing rollers, as even minor amounts of leakage can involve annoying housekeeping problems.

The present invention provides a new and improved apparatus which incorporates many of the advantageous features of the patented apparatus while constituting an improvement thereover in certain respects. Specifically, the structure of the present invention utilizes to advantage the inverted triangular roller configuration for deriving first and second processing nips from a three-roller arrangement. However, as distinguished from the patented apparatus, in which the rollers themselves form the container for the primary treating solution, in the new apparatus there is provided a treating solution pan disposed below the central roller of the three-roller configuration and arranged to retain treating solution at a level at which the central processing roller will be partially submerged.

In accordance with the new invention, the incoming fabric, instead of traveling upwardly through the first processing nip, as in the patented apparatus, passes downwardly through that nip, around and below the central processing roller, and then upwardly through the second processing nip. A particularly unusual feature of this arrangement resides in the fact that the processing rollers forming the first or extracting nip define a trough which retains liquid. The new apparatus includes a unique drain chute arrangement mounted in wiping engagement with ends of the central processing roller to receive extracted or excess liquid as it flows laterally out of the trough in which it is collected. The liquid is diverted by the drain chutes to a collection pan, and is thus kept from draining into the supply of treating solution. Because the drain chutes need to contact only one of the three processing rollers and because there is no requirement that these chutes retain a body of liquid against a pressure head, the conditions which might otherwise present a leakage problem are not present, and a simple wiping engagement between the drain chute and the central processing roller is entirely adequate.

The apparatus of the invention also incorporates a number of advantageous mechanical features providing for the convenient and trouble-free handling of the incoming fabric and for the retention and removal of treating solutions.

For a better understanding of the above and other features and advantages of the invention, reference should

DESCRIPTION OF THE DRAWINGS

FIG. 2 is a front elevational view of the apparatus of FIG. 1, as viewed generally along line 2—2 of FIG. 1.

FIG. 3 is a fragmentary cross-sectional view taken generally along line 3—3 of FIG. 2.

FIG. 4 is a greatly enlarged, fragmentary view, with parts broken away to illustrate arrangements for mounting a solution pan.

FIGS. 5 and 6 are enlarged, fragmentary cross-sectional views, taken generally along lines 5—5 and 6—6 respectively, of FIG. 3.

FIG. 7 is an enlarged plan view illustrating details of a drain chute arrangement incorporated in the apparatus of FIG. 1.

DESCRIPTION OF A PREFERRED EMBODIMENT OF THE INVENTION

Figure 1:
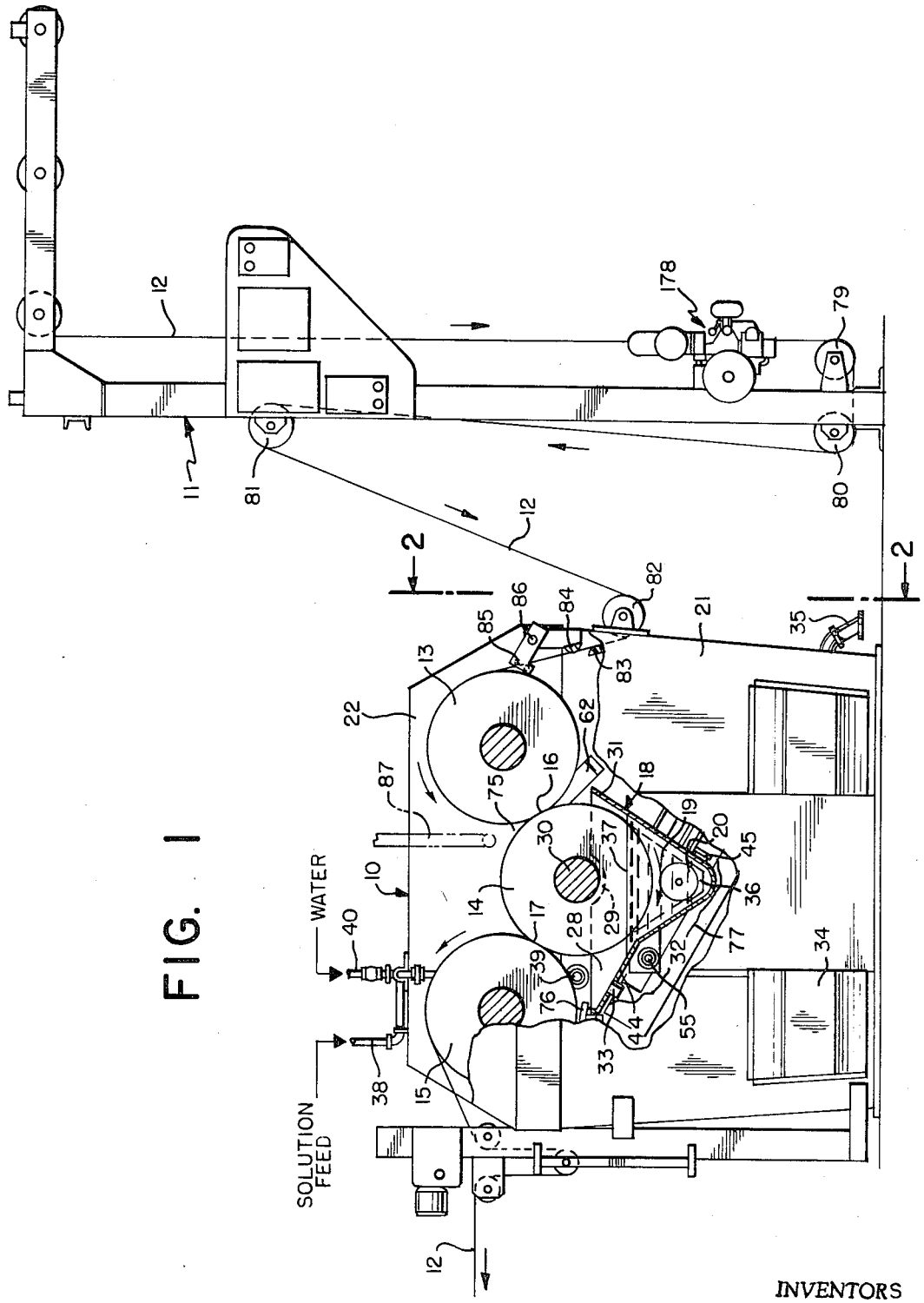
FIG. 1 is an elevational view, with parts broken away, of a fabric processing installation, particularly for open width knitted fabrics, incorporating the features of the invention.

Referring now to the drawings, and initially to FIG. 1 thereof, the reference numeral 10 designates generally the processor installation according to the invention, which is typically associated with a fabric in-feed system designated generally by the numeral 11. In the illustration, fabric to be processed, advantageously knitted fabric in an open width form, is derived from a supply (not shown) and is directed through the fabric in-feed system 11, which functions to align the fabric, flatten it, uncurl its edges, and the like, so that the fabric 12 is presented to the processing installation in a form suitable for its subsequent treatment. Typically, at this stage, the fabric is in a wet condition from a prior operation, such as scouring, bleaching, etc.

From the in-feed system 11, the fabric 12 is caused to travel over and around an entry-side processing roller 13, underneath and around a central processing roller 14, and over and around an exit-side processing roller 15, after which it exits from the machine. In accordance with the invention, the processing rollers 13–15 are arranged in an inverted triangular configuration, along parallel axes, with the entry-side and exit-side processing rollers 13, 15 separately contacting the central roller 14 and forming therewith a first processing nip 16 at the entry side and a second processing nip 17 at the exit side.

Below the central processing roller 14, there is mounted a treating solution pan 18 adapted to retain a supply of treating solution 19 at a level to at least partly submerge the central processing roller 14. Thus, in the processing sequence, the incoming fabric 12, after passing over and around the entry-side processing roller 13, passes through the first processing nip 16, where it is subjected to a predetermined rolling pressure by the rollers 13, 14. Typically, the rolling pressure applied at this point is of a magnitude appropriate for expressing from the fabric as much as practicable of its existing content of liquid from prior treating operations. After emerging from the first processing nip 16, the fabric 12 passes under and around the central processing roller 14, usually while remaining in direct contact with the surface of the roller, but in some cases being diverted downward around an idler roll 20. In either instance, the fabric is exposed to and impregnated by the treating solution 19, after which the fabric travels upward and through the second processing nip 17 formed by the processing rollers 14, 15. If desired, supplementary pressure rollers (not shown) may be provided to squeeze the fabric against the main processing roller 14 while the fabric is submerged in the processing liquid. The rolling pressure applied at the second processing nip is calculated to remove excess processing solution from the fabric and to cause the solution to thoroughly impregnate all portions of the fabric structure. The thus-treated fabric is then conveyed away to a subsequent processing stage for drying, curing or either additional processing.

The liquid processing machine 10 typically includes a heavy frame structure including side frames 21, 22 (FIG. 2) and transverse connecting members such as reflected at 23, 24. These frame structures include means for journaling the shafts of the processing rollers 13–15. By way of example, the arrangements shown in the before-mentioned Pat. No. 3,207,616 may be utilized for mounting and journaling of the processing rollers, and providing for variable application of pressure to the entry-side and exit-side rollers 13, 15 for controlling the working pressures at the processing nips 16, 17. Typically, the central processing roller 14 (only) is arranged to be driven by a motor 25. However, where desired, arrangements such as shown in the E. Cohn et al., U.S. Pat. No. 3,261,184 may be utilized to maintain a synchronized, positive drive relationship for all three of the processing rollers.

As reflected in FIG. 2, the processing rollers 13–15 typically may comprise a hollow steel roller body 26, surrounded by a resilient covering material 27. Desirably, the first processing nip 16 may be a somewhat "harder" nip than the second nip 17, particularly where the first nip 16 is intended to perform an extraction function. This may be realized by, among other things, providing a more resilient covering material for the exit-side processing roller 15 than for the entry-side roller 13. For example, the entry-side roller may have a covering of 90 durometer (Shore) density, while the exit-side roller 15 may have a covering of 89 durometer density. The central processing roller 14 may, in such a case, have a covering density on the order of 100 durometer. In any case, the surface resilience of the processing rollers is such that the roller covering materials can close about the edges of the fabric, in close proximity to the fabric edge extremities, so that there is pressure contact between the roller surfaces in the regions outward of the fabric edges.

As reflected in FIG. 1, the treating solution pan 18 is of a generally V-shaped cross-sectional configuration and has end walls 28 extending upwardly along the end surfaces of the central processing roller 14 to form a trough-like receptacle capable of receiving the lower portion of the roller 14. Typically, the solution pan side walls 28 may be recessed at 29 to receive the roller shaft 30, enabling the processing roller 14 to be received almost to its mid-point in the solution pan 18. The front or entry side wall 31 of the solution pan extends upward in relatively close proximity to the surface of the processing roll, while providing adequate clearance for the passage of the fabric 12. On the exit side, the pan wall 32 extends upwardly into close proximity to the processing roller 14, and then extends at a somewhat flatter angle toward the exit side of the machine, terminating below and well to the rear of the padding nip 17.

Typically, the solution pan 18 is provided with an overflow outlet 33 arranged to discharge into a collection pan 34 provided in the lower portion of the machine structure for the collection of overflow and discharge materials. A sump outlet 35 is provided for the eventual removal of the materials from the collection pan.

As a general rule, the dimensions of the treating solution pan 18 are such as to enable a substantial lower portion of the processing roller 14 to be submerged in the treating solution 19 with a relatively small volume of the solution. In the illustrated arrangement, the processing roller is submerged over an arc of approximately 90° or more. The volumetric capacity of the solution pan is also enlarged sufficiently to accommodate the presence of the idler roll 20, which is removably supported inside the walls of the solution pan by brackets 36 (FIG. 2) at each side.

In the operation of the equipment, the solution level in the plan 18 desirably is maintained approximately at the line 37 indicated in FIG. 1. This is accomplished in any suitable manner by a solution feed supply pipe 38 having a discharge 39 located over the open top of the solution pan. A separate water line 40 may also be provided to accommodate processing operations in which the fabric is to be merely wetted out with water.

To advantage, the solution pan 18 is mounted on grooved carriage wheels 41, 42 secured to the side walls 28, and adapted to run on inclined carriage tracks rails 43 of inverted "V" shaped configuration. The track rails 43, provided at each side of the machine, are inclined downwardly toward the exit side of the machine at an angle that will accommodate a simultaneous downward and forward movement of the solution pan, permitting the upper portion 44 of the pan wall to clear the processing roller and bringing the pan into a retracted position at the front of the machine to facilitate inspection and cleaning. A drainage outlet 45 is provided in the front wall of the pan, and this is positioned directly over the collection pan 34 when the solution pan is in its retracted position.

Movement of the solution pan between its retracted and operative positions is effected by air cylinders 46 at opposite sides of the machine carrying sheaves 47 at the outer ends of their actuating rods 48. Lifting cables 49 are anchored to the machine frame at 50, extend around the sheaves 47, in the lower portion of the machine frame, then around idler sheaves 51, 52 in the upper portion of the frame. The cables then extend downwardly from the last idler sheave 52 to make connection with the solution pan carriage. As reflected in FIG. 5, the idler sheaves 51, 52 desirably are aligned in different planes to minimize the space requirements of the pan carriage system. Accordingly, small idler rolls 53, 54 are provided to guide the cable 49 between the sheaves 51, 52.

To assure synchronization of movement of the solution pan at both sides, in response to actuator movement, the pan carriage structure rotatably supports a transverse shaft 55 (FIG. 3) mounting a sprocket wheel 56 at each end. Chain sections 57 are mounted along the undersides of the carriage track rails 43 such that the respective sprockets 56 and chain sections 57 function as rack and pinion assemblies. Thus, if one side of the solution pan tends to move at a different rate than the other, because of friction effects or the like which differ from one side to the other, a balancing torque will be applied through the shaft 55 tending to retard one side and advance the other to achieve the necessary coordinated movement.

To prevent accidental lowering of the solution pan resulting from air pressure loss and also to avoid the need for maintaining a constant pressure load on the air zone 46, locking cylinders 58 are provided at each side, mounted on brackets 59 extending along the carriage track rails 43. The locking cylinders 58 have extendable elements 60 which are projected into a locking position behind the lower carriage wheel 42 at each side to support the weight of the carriage and prevent its downward movement along the track. As will be apparent in FIG. 3, the brackets 59 serve in an additional capacity to prevent the carriage wheels 41, 42 from becoming disengaged from the carriage track rails. 43. Plates 61 at the lower ends of the brackets 59, also serve to limit the extent of downward movement of the carriage wheel 42, and thus define the lower or retracted position of the solution pan.

In accordance with one aspect of the invention, drain chutes 62 are provided at each side of the machine, in contact with the end walls 63 of the central processing roller 14 in the region about and below the extracting nip 16. The drain chutes 62 advantageously have bottom walls 64 inclined in a downward direction, toward the entry side of the machine, and side walls 65 which, together with the bottom wall, form a gravity discharge point 66 located above the collection pan 34 and forward of the upper edge of the solution pan 18. The bottom wall 64 of the discharge chute has a cut-out portion, in which an "L"-shaped resilient wiping element 69 is secured by means of a suitable clamping plate 70. The arrangement is such that the side portion 71 of the wiping element is retained in wiping contact with the side edge 63 of the processing roller 14, while the bottom portion 72 of the wiping element is maintained in wiping contact with the end margin of the cylindrical surface 73 of the roller. As reflected in FIGS. 2 and 3, the inward extending portion 74 of the drain chute bottom also extends underneath the end margins of the entry-side processing roller 13.

In some cases, it may be desirable to mount wiper elements (not shown) against the upward traveling end surface portions of the central roller 14. These would wipe off treating liquid clinging to the end surfaces of the roller as they emerge from the solution. The wiped-off solution simply drops back into the solution pan 18.

When wet fabric is advanced into the first processing nip 16, during operation of the equipment, the rolling pressure applied between the processing rollers 13, 14 causes most of the liquid content of the fabric to be squeezed out and retained on the upstream side of the nip in the trough 75 formed by the rollers 13, 14. As a feature of the invention, the end areas of the processing rollers are not sealed or dammed, so that this expressed liquid simply flows laterally along the trough 75 and spills out over the edges of the processing rollers. In an equipment of typical size (e.g., capable of handling fabric widths of 90 inches or even greater) operated at typical speeds, the extracted liquid readily flows to the sides of the processing rollers and can be easily disposed of in the manner of the invention.

As the expressed liquid flows to the ends of the trough 75 and over the edges of the processing rollers, it is carried downward by a combination of gravity and the clockwise (as viewed in FIGS. 1 and 3) rotation of the central processing roller 14. The thus flowing liquid is contacted by the lateral portion 69 of the wiping element and directed to flow onto the bottom of the drain chute 62, from whence it readily flows to the discharge point 66 and into the collection pan 34. Any of the liquid which tends to flow laterally inward onto the cylindrical surface of the processing roller 14 is picked up by the bottom portion 72 of the wiping element and again directed to flow onto the bottom of the drain chute. As will be appreciated, since there is no pressure head behind the flowing liquid, the wiping element 69 may have a relatively light wiping contact with the roller surface without compromising its performance.

To the extent that any of the expressed liquid tends to flow onto the end surface of the entry-side processing roller 13, it will drain either into the drain chute 62 or will drop directly into the collection pan 34 from the lower extremities of the roller. Thus, the liquid expressed at the extracting nip is diverted away from the treating solution pan 18 and does not dilute or contaminate the composition of the treating solution. In this respect, it will be understood that although the fabric being processed may be of less width than the processing rollers, as reflected in FIG. 2, for example, the resiliency of the roller surface coverings 27 permits the roller coverings to close around the edges of the fabric and establish sealing contact closely adjacent to the fabric edge extremities. As a result, the amount of extracted liquid carried through the extracting nip is inconsequential.

As the fabric emerges from the treating solution pan 18 on the exit side, it will, of course, carry with it significant excess quantities of the treating solution. The excess solution is expressed at the second processing nip 17, as the fabric travels upward therethrough, and will cascade back into the solution pan 18. Any amounts of the treating solution which are retained on the surface of the exit-side processing roller 15 may to some extent eventually tend to drip off the lower portion of the roller. For this purpose, a drainage plate 76 is provided, extending across the entire width of the roller 15 and having its discharge edge disposed over the wall 44 of the solution pan 18. Thus, when the solution pan is in its raised position, the solution drippings from the process roller 15 are returned to the main body of the solution.

As shown in FIG. 3, a drainage pan 77 is mounted in the machine frame, extending across and underneath the solution pan 18. Its upper extremity underlies the discharge of the drainage plate 76 and its lower extremity overlies the collection pan 34. Accordingly, when the solution pan is in its lowered or retracted position, drainage from the plate 76 flows onto the drainage pan 77 and is ultimately discharged into the collection pan 34.

In the system of the invention, the incoming fabric 12 typically will be passed through a station 78 (FIG. 1) which includes means for flattening the fabric and centering it relative to the machine. The fabric may then pass around a series of idler rolls 79—82, the latter constituting an entry guidance roller which is carried by the processing machine. After the fabric passes around the entry guidance roller 82, it is passed over and under a pair of herringbone spreader bars 83, 84, which again flatten the fabric and smooth it to its full width. The fabric then passes between pairs of uncurling nozzles 85, adjustably mounted on a transverse rod 86 and positioned adjacent to fabric edges and arranged to direct jets of air in an outward direction over the edge margins of the fabric. This removes any edge curl from the fabric. Immediately thereafter, the fabric is brought into contact with the surface of the entry-side processing roller 13. Once in contact with the roller surface the fabric is effectively stabilized in its smooth, flat condition.

Particularly with certain types knitted fabrics such as jerseys, it may be important to lay the fabric onto the surface of the entry-side processing roller well in advance of the first processing nip 16. This enables the fabric to be brought into a smooth, flat, curl-free condition and then maintained in that condition by contact with the roller as it is conveyed thereby to the extracting nip.

In some instances, it may be desired to introduce a processing liquid in the region immediately above the first processing nip 16. For this purpose, a supply pipe 87 may be provided to spray or otherwise impart liquid to the fabric approaching the extracting nip. Excess quantities of such liquid will, of course, simply flow laterally out of the trough configuration 75 of the rollers and be removed by the drain chutes 62. In cases where the liquid introduced by the supply pipe 87 is a special treating solution, as distinguished from plain water, for example, additional provisions may be utilized for collecting the solution from the drain chutes 62 in a manner suitable for recirculation.

The new apparatus can be used to special advantage in two-solution or so-called "double dip" processing, in which the fabric is impregnated in sequence with each of two reactive soutions. In such cases, the first solution may be suppiled through the pipe 87 and applied to the fabric at the first processing nip 16. The fabric then passes directly into the second solution, in the pan 18, enabling the desired chemical reaction to be achieved. This two-stage impregnation is achieved with the new apparatus, while maintaining complete geometric control over the fabric by reason of its contact with the roller 14.

In some instances, when utilizing a two-liquid processing technique, it is desirable to guide the incoming fabric directly into the first processing nip 16, in such a manner that the fabric is initially contacted on both sides by the first processing liquid before entering the nip.

In the system of the invention, advantageous use is made of an inverted triangular configuration of processing rollers, as in U.S. Pat. No. 3,207,616, but further advantages are realized by providing for the retention of treating solution in a pan mounted directly below and partially submerging the central roller of the triangular group. With this arrangement, minor leakage of the treating solution—sometimes an annoyance—is eliminated. Further, cleanup of the equipment and changing of the treating solutions, as may be routinely required, is greatly facilitated.

In the system of the invention, extracting of an incoming wet fabric is accomplished while the fabric is traveling in a generally downward direction through the extracting nip. Because the resilient processing rollers close quickly about the edge extremities of the fabric passing through the nip, the extracted liquid is held back by the processing rollers and flows laterally to the ends thereof. Special drain chutes, provided at the end of the central processing roller, in wiping contact therewith, enable this extracted liquid to be picked up and diverted away from the treating solution pan for separate collection and/or disposal.

It shoud be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:
1. A processing apparatus for treating fabrics, which comprises
   (a) three processing rollers arranged with their axes disposed in parallel relation, and in an inverted triangular configuration,
   (b) the surface of the entry-side upper roller contacting the surface of the central roller along a line below the upper extremities of the central roller surface to form a first processing nip,
   (c) the surface of the exit-side upper roller contacting the central roller surface to form a second processing nip,
   (d) a treating solution pan mounted below said central roller and having means for maintaining a treating solution level above the lower extremtities of the central roller surface,
   (e) means for guiding incoming fabric in a generally downward direction through said first processing nip, through said treating solution pan, and then in a generally upward direction through said second processing nip,
   (f) processing rollers having resilient surface coverings enabling the covering material of a contacting pair of rollers to close together beyond the edges of the fabric,
   (g) solution drainage means disposed at the ends of the processing rollers forming the first processing nip, in wiping contact with portions of the flat and cylindrical surfaces of the central roller at its ends,
   (h) said drainage means extending downward from the end extremities of said first processing nip and discharging at points outside the treating solution pan,
   (i) said first processing nip being generally open at its ends to accommodate a generally free lateral flow of extracted liquid to said drain chutes.

2. The processing apparatus of claim 1, further characterized by said means for guiding the incoming fabric comprising
   (a) means for delivering the fabric in flat form onto the surface of the entry-side upper roller at a point from said first processing nip, and
   (b) means for guiding, flattening and uncurling the fabric in advance of said entry-side upper roller.

3. The processing apparatus of claim 1, further characterized by
   means being provided below the central roller for guiding the fabric through the solution pan at a predetermined level below the lower surface extremity of the central roller.

4. The processing apparatus of claim 1, further characterized by (a) a collection pan being mounted below and on the entry side of said treating solution pan for the reception of liquid material from said drain chutes, (b) a drainage plate being disposed beneath the exit-side upper roller and discharging into the treating solution pan, and (c) a drainage pan disposed below the treating solution pan and extending from the drainage plate to the collection pan.

5. The processing apparatus of claim 1, further characterized by (a) inclined track means for movably supporting the treatment solution pan under said central roller, (b) said inclined track means being inclined downward toward one end of the apparatus and accommodating movement of the treatment solution pan downward and toward said one end to facilitate cleaning of the pan.

6. The processing apparatus of claim 5, further characterized by (a) air cylinder means being provided for controllably raising and lowering said solution pan along said inclined track means, and (b) locking means for supporting said solution pan in its upper operating position independent of said air cylinder.

7. A processing apparatus for treating fabrics, which comprises (a) a first resiliently covered processing roller supported at the entry side, (b) a second resiliently covered roller supported below and on the downstream side of said first roller and being in resilient surface contact therewith to form a first processing nip, (c) a treating solution pan mounted below said second roller and arranged for containment of solution at a level above the lower surface extremities of the second roller, (d) means in wiping engagement with the opposite end surface regions of the second roller below the level of first processing nip for receiving and diverting away from the solution pan liquids flowing laterally at said first processing nip, (e) means for guiding fabric in flat form in a generally downward direction into said first processing nip and through the treating solution beneath said second roller, and (f) means forming a second processing nip for removing excess treating solution from said fabric.

8. A processing apparatus according to claim 7, further characterized by said means forming a second processing nip comprising said second roller and a third roller in resilient rolling engagement therewith.

9. A processing apparatus according to claim 8, further characterized by (a) means for flowing a first processing liquid into the region immediately above said first processing nip, and (b) means for flowing a second processing liquid into said solution pan.

10. A processing apparatus according to claim 8, further characterized by said rollers being arranged in an inverted triangular configuration.

11. A processing apparatus according to claim 7, further characterized by (a) means external of the fabric being provided for introducing processing liquid to the region above the first extracting nip, (b) excesses of said processing liquid flowing freely in a lateral direction and being directed away by said drainage means.

12. A processing apparatus according to claim 7, further characterized by (a) said drainage means being provided with L-shaped wiping elements having first portions extending along the end surfaces of the second roller and second portions extending inwardly along its cylindrical surface, (b) the first portions of said wiping elements extending downward in the upstream direction, generally beneath said extracting nip, and terminating at said second portions, (c) the second portions of said wiping elements extending a short distance inward along said cylindrical surface, from said end edges, below said first processing nip.

13. A processing apparatus according to claim 7, further characterized by (a) inclined track means being provided at opposite sides of the apparatus for movably supporting the treating solution pan, (b) fluid cylinders being provided at each side for controllably raising and lowering said pan along said tracks, and (c) mechanical equalizing means associated with said solution pan for equalizing the motion of the cylinders at each side.

14. The method of processing fabric in open width form which comprises (a) presenting the fabric in smooth, flat condition, free of edge curl, (b) directing the thus-presented fabric downwardly through a first processing nip formed by the entry-side roller and a second roller, (c) carrying the fabric through a treating solution bath while maintaining the fabric in contact with the second roller, and (d) conveying the fabric in an upward direction through a second processing nip while maintaining the fabric in contact with the second roller, and (e) removing liquid from the vicinity above the first processing nip by causing it to have a generally unrestricted lateral flow to the side edge areas of the second roller and draining the liquid away from said side edge areas.

15. The method of claim 14, further characterized by the presented fabric being wet fabric and being applied to the surface of the entry-side processing roller substantially in advance of the extracting nip.

16. The method of claim 14, further characterized by (a) introducing a first processing solution into the presence of the fabric immediately in advance of the extracting nip, and (b) said treating solution bath constituting a second processing solution.

17. The method of claim 16, further characterized by said first and second processing solutions are chemically reactive.

References Cited

UNITED STATES PATENTS

| 3,421,164 | 1/1969 | Zuczek | 68—22 R |
| 3,513,670 | 5/1970 | Purdie | 68—22 R |

FOREIGN PATENTS

| 833,468 | 4/1960 | Great Britain | 68—22 R |

WILLIAM I. PRICE, Primary Examiner

U.S. Cl. X.R.

68—22 R, 271